United States Patent [19]
Gupta et al.

[11] Patent Number: 5,303,377
[45] Date of Patent: Apr. 12, 1994

[54] METHOD FOR COMPILING COMPUTER INSTRUCTIONS FOR INCREASING INSTRUCTION CACHE EFFICIENCY

[75] Inventors: Rajiv Gupta, Ossining; Chi-Hung Chi, Croton-on-Hudson, both of N.Y.

[73] Assignee: North American Philips Corporation, New York, N.Y.

[21] Appl. No.: 500,627

[22] Filed: Mar. 27, 1990

[51] Int. Cl.$^5$ .................................. G06F 9/44
[52] U.S. Cl. ........................... 395/700; 364/DIG. 1; 364/280.4; 364/280; 364/280.5; 364/243; 364/243.4; 364/243.41; 364/243.42
[58] Field of Search ............................ 395/425, 375

[56] References Cited

U.S. PATENT DOCUMENTS

| | | | |
|---|---|---|---|
| 4,965,724 | 10/1990 | Utsumi et al. | 395/700 |
| 4,991,088 | 2/1991 | Kam | 395/425 |
| 5,088,034 | 2/1992 | Ihara et al. | 395/700 |

OTHER PUBLICATIONS

A. D. Samples et al, "Code Reorganization for Instruction Caches," Report No. UCB/CSD 88/447, University of CA, Berkeley Oct. 1988.
Cytron et al, "Automatic Management of Programmable Caches", International Conf on Parallel Processing, vol. 2, pp. 229-238, 1988.
Fuhrt et al, "Compiler-Directed Cache Strategy for GaAs Microprocessor Architectures", 1988 IEEE Southeastern Conf. Proc., pp. 186-192.
McFarling "Program Optimization for Instruction Caches", ASPLOS Proceedings ACM x-303, pp. 183-191 1989.
H. Cheong, et al., "Compiler-Directed Cache Management in Multiprocessors", Computer, Jun. 1990, vol. 23, No. 6 pp. 39-47.
D. Gannon, "Strategies for Cache and Local Memory Management by Global Program Transformation", Super Computing, 1st Intern. Conf Proc, 1988, pp. 229-254.
Karlovsky, "Automatic Management of Programmable Caches: Algorithms and Experience", CSRD Rpt #892, Center for Supercomputing Research and Development, Jul. 1989.
Weber, "Compiler Optimization in RISC Systems", Digital-Technical Journal, vol. 2, No. 2, Spring 1990, pp. 89-95.

*Primary Examiner*—Kevin A. Kriess
*Attorney, Agent, or Firm*—David Schreiber

[57] ABSTRACT

Method for compiling program instructions to reduce instruction cache misses and instruction cache pollution. The program is analyzed for instructions which result in a non-sequential transfer of control in the program. The presence of branch instructions and program loops are identified and analyzed. The instructions are placed in lines, and the lines are placed in a sequence to minimize potential misses.

19 Claims, 4 Drawing Sheets

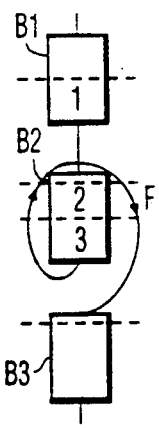 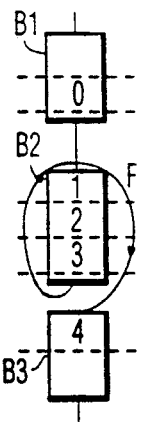 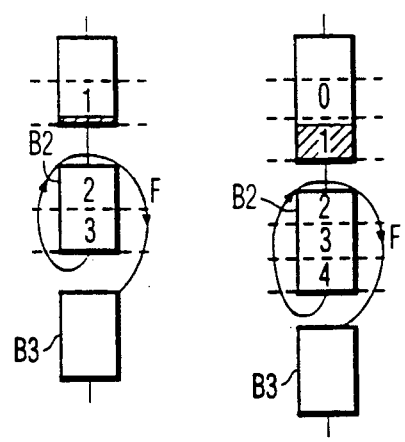
FIG. 3A   FIG. 3B   FIG. 4A   FIG. 4B
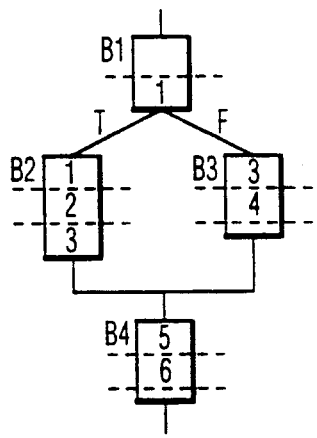 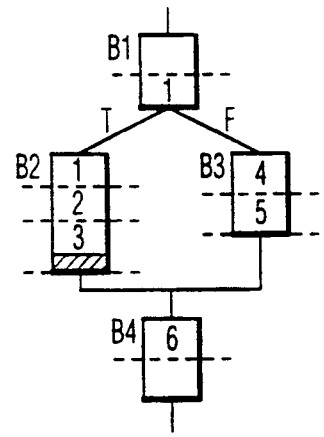
FIG. 5A   FIG. 5B
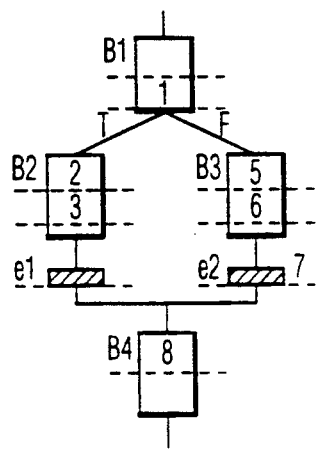 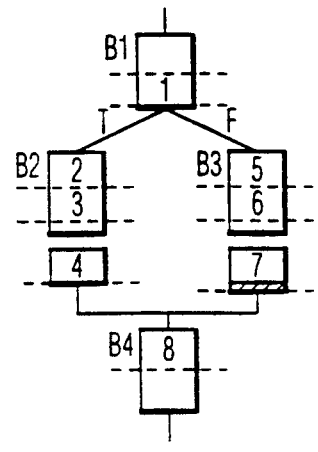
FIG. 6A   FIG. 6B

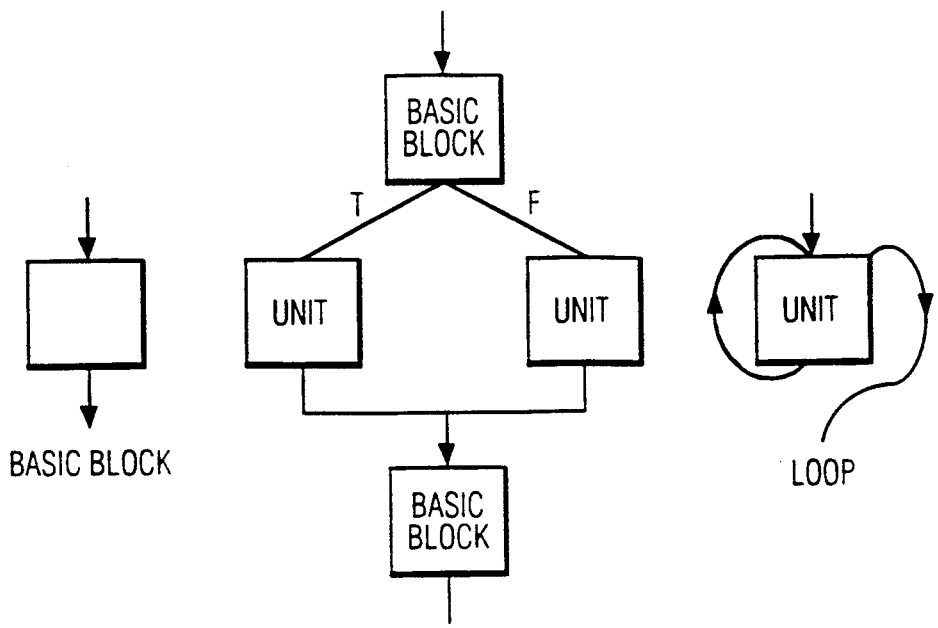
FIG. 7
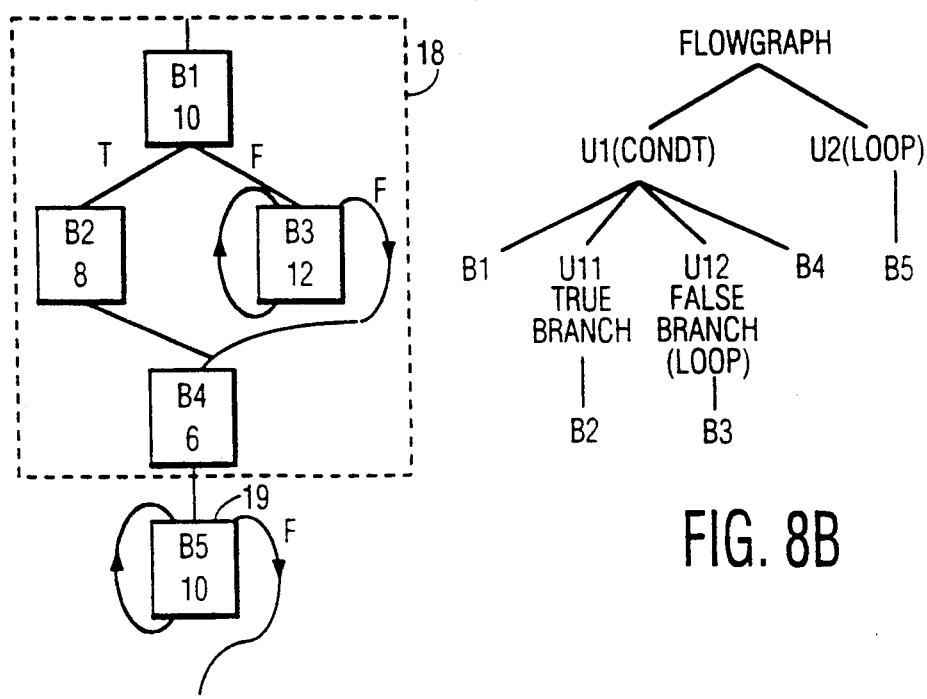
FIG. 8A
FIG. 8B

CODE POSITION
IN MAIN MEMORY

METHOD FOR COMPILING COMPUTER INSTRUCTIONS FOR INCREASING INSTRUCTION CACHE EFFICIENCY

The present invention relates to computer processing systems which utilize instruction caches. Specifically, a method for compiling instructions in instruction memory to reduce instruction cache pollution and instruction cache misses is described.

The use of instruction caches has reduced the disparity of operational speeds between higher speed processors and slower access times of instruction memories. The instructions of a program are grouped into lines of instructions which are prefetched into a cache register. The processor references and executes instructions in accordance with the program counter which identifies the particular instruction to be executed. Referenced instructions are transferred from the instruction cache to the processor for execution. When the instruction cache has available space due to the execution of lines of instructions by the processor, additional lines of instructions are fetched into the instruction cache from the program memory during the next available bus cycle.

The efficiency of these instruction cache techniques depends upon prefetching the next required set of instructions. When the processor references instructions which are not in the cache, a miss occurs and a memory cycle is used to prefetch the line containing the referenced instruction. Instructions may also be prefetched in the instruction cache which are not referenced by the processor. These instructions represent pollution for the instruction cache, limiting the amount of space for storing other needed instructions. Pollution within a line results when only some instructions of a line are referenced by the processor.

Most instruction caches are not large enough to hold a complete program. Thus, conditional statements and program loops will always result in the referencing of instructions not in the cache if the loading sequence for the cache is sequential. These executions require a memory access which burdens the system bus while a fetch of the line containing the required instruction occurs, thus diminishing the efficiency of the cache.

SUMMARY OF THE INVENTION

It is an object of this invention to improve instruction cache efficiency.

It is a more specific object of this invention to reduce pollution of instruction caches.

It is yet another object of this invention to compile program instructions in an order which reduces the likelihood of a cache miss or cache pollution.

These and other objects of the invention are provided by a method which compiles the instructions of a program in an order which improves instruction cache efficiency. The program is analyzed for instructions which result in a non-sequential transfer of control in the program. The presence of branch statements and program loops are identified, as well as the instruction execution sequence for these conditions. The program is compiled in a sequence which will result in fewer cache misses and less cache pollution.

This analysis permits the lines of instruction to be formed so that either the entire line is executed, or none of the instructions in the line are executed. Thus, partial line pollution is avoided.

Instructions are repositioned in an instruction memory to avoid partial line pollution. Branch instructions are positioned so that higher probability target instructions follow decision instructions. Loops of instructions are positioned in memory so that the starting instruction is at the boundary of a line.

The repositioning of the instructions in the instruction memory results in fragmentation of the memory. The unused storage space may include duplicate instructions which are to be executed during a subsequent portion of the program.

BRIEF DESCRIPTION OF THE FIGURES

FIGS. 3A and 3B illustrate the compilation of instructions forming a program loop.

FIGS. 4A and 4B illustrate the repositioning of the loop instructions of FIGS. 3A and 3B to reduce the number of cache lines occupied by the loops.

FIGS. 5A and 5B illustrate the compilation of branch instructions and a repositioning of the branch instructions to avoid a cache miss and reduce cache pollution.

FIGS. 6A and 6B illustrate the compilation of branch instructions which have been repositioned, and the duplication code inserted in fragmented memory cells.

FIG. 7 illustrates the basic units of a flow graph.

FIGS. 8A and 8B illustrate a flow graph and a corresponding repositioning tree for generating a repositioning algorithm.

DESCRIPTION OF THE PREFERRED EMBODIMENT

Figure 1:
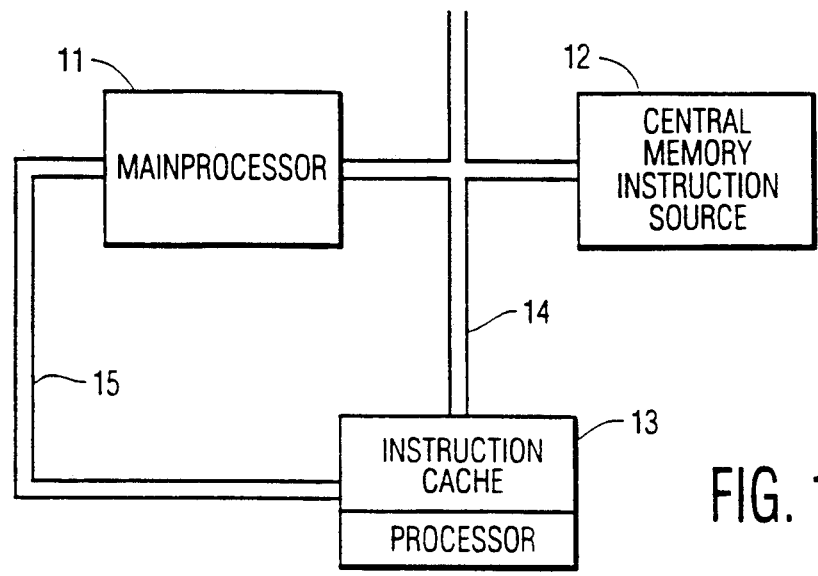
FIG. 1 is an illustration of a computer processing system which uses an instruction cache.

FIG. 1 illustrates a main processor 11 which uses an instruction cache 13. The instruction cache 13 provides an interface between the central memory instruction source 12 and the much faster main processor 11. The instruction cache 13 prefetches lines of instruction stored in the central memory instruction source 12 for access by the main processor 11.

As is known from the text *High Speed Memory Systems*, A. V. Pohm and O. P. Agrawahl, 1983 Reston Publishing Company, Inc., such instruction caches serve as a transparent bridge between the high speed main processor 11 and the slower speed central memory instruction source 12.

A prefetch processor associated with the instruction cache 13 will sequentially prefetch lines of instruction stored in the central memory 12. During an available bus cycle, a plurality of lines of instructions are moved from the central memory instruction source 12 to the instruction cache 13. These instructions are thereafter available for execution by the main processor 11, when the main processor 11 program counter references a required instruction.

As is known in systems of this type, cache misses occur when the main processor 11 requests an instruction which is not in the instruction cache 13. The resulting miss requires that, in the next available bus cycle, the instruction cache 13 address the particular referenced instruction which resulted in a miss for the instruction cache 13.

The instructions in the central memory instruction source 12 are organized in lines of instructions. A line may include two or more instructions to be transferred as a unit to the instruction cache 13. Individual instructions of a line referenced by the main processor 11 are available for execution from the instruction cache 13.

The aforesaid problem of a cache miss burdens the system bus by requiring a specific reference to the central memory instruction source 12, thus halting the main processor 11 until the required instruction becomes available. During the fetching of the instruction, the bus is not available to service other tasks which may need to be performed by the main processor 11. The result is a reduction in system efficiency.

Cache pollution and cache misses may be reduced by repositioning the instructions of the program in the central memory instruction source 12 such that whenever a line is executed, either all of the instructions of a line or none of the instructions of a line are executed. Therefore, it is guaranteed that at least all the instructions will be executed at least once.

The fetching of instructions on a line basis may necessarily result in some instructions of the line not being referenced by the main processor 11. This results in pollution of the instruction cache 13 by having non-used instructions inserted within the cache usurping space for other needed instructions.

Cache misses and pollution result because the program being executed is not entirely sequential. When loops and conditional statements are encountered, the main processor 11 references a target instruction or returns to the beginning of the loop, which is a non-sequential execution. Thus, when instructions are prefetched on a strictly sequential basis, these conditions produce cache misses.

Figure 2A:
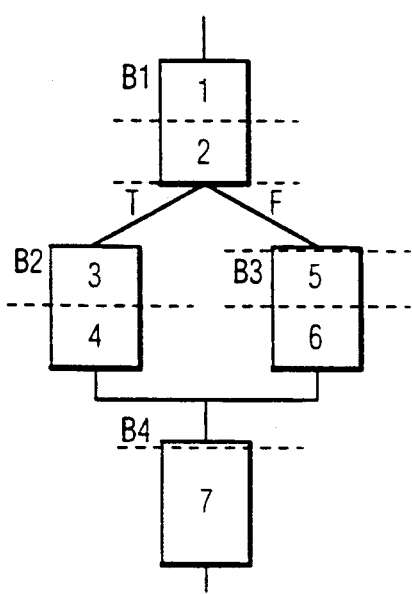
FIG. 2A, illustrates the compilation of a computer program into lines of instructions which comprise instruction blocks.

The organization of program instructions for the central memory instruction source are shown diagrammatically in FIG. 2A. $B_1$, $B_2$, $B_3$ and $B_4$ are blocks of instructions. Blocks $B_2$ and $B_3$ are paths of a conditional instruction. The conditional instruction is located in block $B_1$ and program control shifts to either $B_2$ or $B_3$, depending on the results of a tested condition. A merging path is shown for each of the branches $B_2$ and $B_3$ as block $B_4$.

Instructions constituting each of the blocks are arranged in lines, wherein each line may include two or more instructions for the block. As illustrated in FIG. 2A, block $B_1$ is accommodated in lines 1 and 2 containing all the instructions for this block. Block $B_2$ includes instructions found in line 3, as well as line 4. Line 4 contains additional instructions constituting the beginning of block $B_3$. Similarly, line 6 contains instructions of block $B_3$ as well as beginning instructions for block $B_4$.

This program structure will result in six lines, 1, 2, 3, 4, 6 and 7, being needed if the true branch $B_2$ is to be executed, and six lines 1, 2, 4, 5, 6 and 7 if the false branch including block $B_3$ is to be executed. It is clear that if the true branch is taken, lines 3 and 4 are prefetched and include pollution in the way of instructions belonging to block $B_3$ which will not be executed.

Figure 2B:
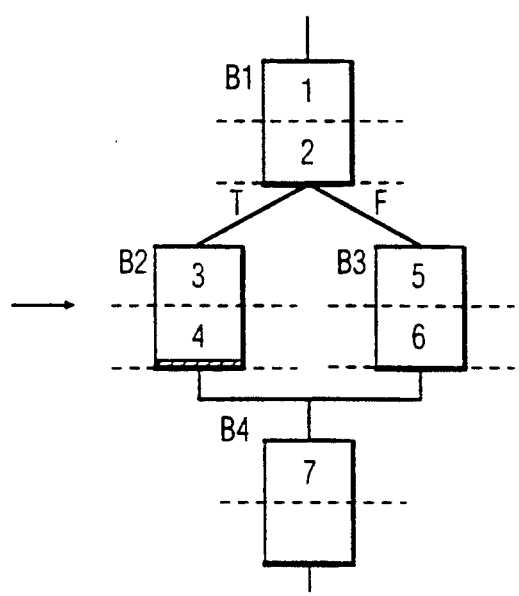
FIG. 2B illustrates the repositioned instructions of FIG. 2A into lines which produce less pollution than the compilation of FIG. 2A.

FIG. 2B illustrates the effect of repositioning the code so that fewer lines need to be fetched in order to execute either the true or the false branch $B_2$ or $B_3$. In FIG. 2B, line 4 is limited to instructions which only belong to $B_2$. Lines 5 and 6 include instructions belonging only to $B_3$ and line 7 includes instructions belonging to block $B_4$, the merging block.

It is clear, with the structure of FIG. 2B, that only five lines need to be fetched for the true branch $B_2$, i.e., 1, 2, 3, 4, 7 and only five lines need be fetched for the false branch $B_3$, i.e., lines 1, 2, 5, 6, 7.

The resulting repositioning of the code improves cache performance with an increase in central memory instruction source fragmentation. The leaving of blank memory space within the memory instruction source 12, however, appears to be a small cost, given the relative inexpense of providing for an additional number of memory spaces.

The repositioning of the code within the central memory instruction source 12 does not interfere with the prefetching sequence, and provides for benefits in cache performance due to a reduction of pollution and fewer required memory cycles to carry out the same execution.

To provide a methodology for repositioning code, such as to reduce pollution and cache misses, a control flow graph may be employed which identifies sources of cache pollution, and possible cache misses.

The procedure requires identifying the program loops and conditional statements which are contained within the program. Repositioning rules are developed which anticipate the change of control from a purely sequential instruction execution order to a target instruction of a conditional statement, or a beginning loop statement from program loops.

Referring now to FIGS. 3A and 3B, general repositioning rules may be determined which will avoid prefetching lines of instructions which are not involved in the loop execution. Program loops are generally executed several times and it is essential during this execution to achieve a high instruction cache performance. Ideally, the cache would be large enough to hold the entire loop body. However, this is not usually practical as cache size limitations are imposed. This is especially true when a cache is implemented in a microcircuit and space for the cache is limited.

As can be seen from FIG. 3A, line 1 includes instructions for block $B_1$ as well as the beginning instructions for block $B_2$. Therefore, while executing the loop represented in block $B_2$, line 1 is required to be present along with lines 2, 3 and 4, when the loop exits to block $B_3$. Those instructions in line 1 belonging to block $B_1$ thus constitute pollution for the cache.

Another source of pollution, shown in FIG. 3B, is line 4, which must be prefetched each time the loop is executed. As these loops are usually executed numerous times, cache pollution results from continuously prefetching instructions from block $B_3$.

Referring now to FIGS. 4A and 4B, there is shown each of the loops of FIGS. 3A and 3B repositioned to avoid polluting the cache. In FIG. 4A, line 1 contains only instructions from the block $B_1$. The loop is confined to a block $B_2$, having instructions wholly in lines 2 and 3. Finally, block $B_3$ begins in line 4. FIG. 4B illustrates a similar repositioning of the loop of FIG. 3B.

It will be recognized that the repositioning results in some fragmentation of the main memory, as well as pollution for the cache, wherein line 1 is not fully occupied with instructions. However, this portion of the program is usually executed only once, and those portions of the program identified by block $B_2$, which are executed a multiple number of times, provide no pollution in the cache. The pollution outside the loop is therefore increased at the cost of low cache pollution during execution of the loop.

The results of the repositioning of the loop can be summarized as requiring that a loop be repositioned to start at a line boundary when that repositioning reduces the number of cache lines occupied by the loop by one, and when the cache line size is greater than the number of instructions of the loop, which occupy a line belonging to another block.

The repositioning of the loop results in one less cache line to be fetched to execute the loop. Pollution of the cache during execution is thereby reduced, as well as bus traffic, when a line is referenced which results in a miss when the processor does not find the required instruction in the cache. This frees the system bus for accomplishing other tasks which would otherwise be needed to service a miss.

The other conditions which result in a non-sequential instruction execution sequence concerns branch instructions. In FIGS. 5A and 5B, branch instructions are shown which have been recompiled from their sequential format of FIG. 5A to a repositioned format as in FIG. 5B. Each of the branches comprises a block $B_2$ and $B_3$. When the true branch $B_2$ is entered, execution of this branch includes instructions from lines 1, 2 and 3. Line 3 contains instructions from block $B_3$, constituting the false branch. These additional instructions thus constitute pollution to the instruction cache. FIG. 5B illustrates how this pollution is removed.

An assessment is made as to the most likely branch to be executed. In the example of FIG. 5B, this is block $B_2$, the true branch. The instruction code is repositioned so that lines 1, 2 and 3 contain all the branch instruction code. The second branch, $B_3$, is positioned immediately following the true branch at a boundary defined by line 4.

The pollution represented in line 5 of FIG. 5A, by combining instructions from the branch $B_3$ with the merging path identified by block $B_4$, may also be eliminated. FIG. 5B illustrates confining the branch instructions belonging to block $B_3$ to end on a boundary of line 5.

When using the foregoing rule, it is possible to have pollution within a branch $B_2$ or $B_3$, as is shown in FIG. 6A. In order for each of the branches to end on a boundary, certain blank spaces are left in memory identified by $e_1$ and $e_2$, corresponding to lines 4 and 7. These spaces may be used to duplicate code which would be found in block $B_4$. As these lines of instruction from block $B_4$ are to be executed following completion of each of the branches represented by blocks $B_2$ and $B_3$, this duplication does not pollute the cache. The number of instructions duplicated along the two paths should be such that a minimum possible unfilled space is left along one of the paths.

As an additional procedure to avoid prefetching instructions which create pollution, it may be possible to group target instructions in the same line as the conditional instruction which shifts program execution. Thus, each target instruction is certain to be included with a prefetch of the conditional statement.

It may also be advantageous to store instructions at strategic locations of the main program memory which are transparent to the main processor, but executed by the cache processor to prefetch instructions which are non-sequential.

To obtain the benefits of repositioning of instruction code, such that the reposition code is compiled in the central memory instruction source 12, the method may incorporate a procedure which decomposes the flow graph into subgraphs and applies repositioning rules to these subgraphs. Shown in FIG. 7 is the basic unit structure of this flow graph approach to repositioning program instructions. The illustration identifies three basic forms of program structure as follows: basic block, conditional and loop.

The basic block comprises those instructions which are executed in sequence and which do not provide a source of pollution or the potential for a cache miss.

The conditional structure illustrates a branch instruction, including a basic block for entering one of two branches, and a basic block for merging the two branches. The third program structure illustrated is a loop.

From a flow graph, represented in FIG. 8A, a repositioning tree of FIG. 8B may be developed and used with a corresponding algorithm to reposition the code, thereby taking advantage of the foregoing repositioned code which results in less pollution and fewer cache misses. In analyzing the flow graph of FIG. 8A, it is clear that a number of the basic program structures exist in this program. There are two larger block structures for this program, identified as 18 and 19. Structure 18 is a branch routine which also contains a loop identified by block $B_3$. The number of lines needed for a block is also shown in FIG. 8A.

The flow graph of FIG. 8B identifies the two major nodes as $U_1$ and $U_2$. $U_2$ comprises the block $B_5$ which is a loop. $U_1$ includes all the blocks comprising the conditional branch 18. This can be broken down to further child nodes of the main node $U_1$, as is shown in FIG. 8B. The two sequential blocks $B_1$ and $B_4$ are identified along with the two branches $B_2$ and $B_3$ within the block 18. Having thus diagnosed the flow graph and its repositioning tree, the following steps may be taken to reposition the various blocks.

```
Reposition(U)
{
    Let u_1,...u_n be the child nodes of U
    for (i = 1; i ≦ n; i ++) loop
    {
        if u_i is a basic block then
            no repositioning is required
        else if u_i is a loop {
            Reposition (loop body);
            apply Loop Repositioning Rule to u_i
        }
        else if u_i is a conditional statement
        {
            Reposition (true branch);
            Reposition (false branch);
            apply Divergence Repositioning Rule to u_i;
            apply Convergence Repositioning Rule to u_i
        }
        else reposition(u_i)
    }
}
```

Figure 9A:
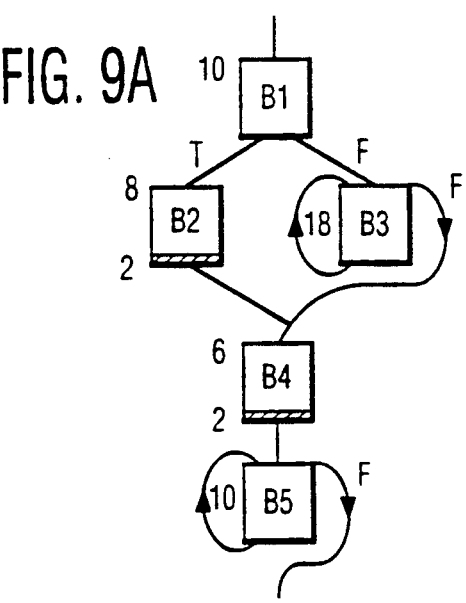
FIGS. 9A and 9B illustrate the repositioned code of FIG. 8A and its storage in the central main memory.
Figure 9B:
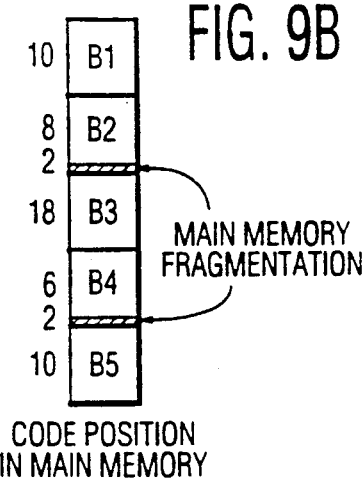

The result of implementing the foregoing repositioning method identifies $B_1$ as a basic block where no repositioning is necessary. As $B_2$ is the conditional branch, corresponding to the true branch, it is repositioned as shown in FIGS. 9A and 9B, according to the foregoing principles, wherein lines containing instructions for $B_2$ do not contain instructions for the other branch, $B_3$. The cache line size is shown to be ten instructions, thus partitioning $B_2$ from $B_3$ with two blank instructions. In this example, it is shown that the cache line size is four.

Continuing with each of the blocks, it is seen that the branch $B_3$ follows on the next line interval from $B_2$, and the loop represented by block $B_5$ is repositioned so as to begin at a line boundary.

As an alternate approach to the flow graph analysis to reposition and compile the program, repositioning may be effected using a control dependence graph. Using a control dependence graph, the program is divided into regions which consist of statements whose execution requires identical control conditions to be true. If a statement in a control region is executed, so are the remaining statements in the control region. Thus, if a cache contains lines of instructions from statements of the same control region, there will never be cache pollution. The control dependence graph may result in a program repositioning which can potentially offer less cache pollution than the repositioning in accordance with a control flow graph. FIGS. 9A and 9B illustrate two situations in which the control flow graph analysis fails to eliminate cache pollution. In FIG. 9A, pollution in line 1 results by including instructions for both blocks $B_1$ and $B_2$. The foregoing control flow graph analysis does not eliminate this source of pollution. However, using the control dependence graph technique, it can be recognized that since $B_1$ and $B_4$ belong to the same control region, grouping of instructions from the two blocks will not cause cache pollution. Additional cache pollution results by unused memory locations at the end of basic block $B_2$ in FIG. 9A. This is also not eliminated using the foregoing techniques.

Figure 10A:
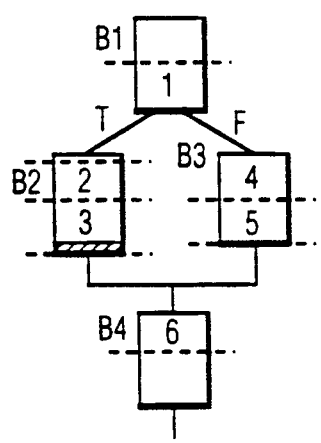
FIGS. 10A and 10B illustrate program structure to be repositioned using a control dependence graph.
Figure 10B:
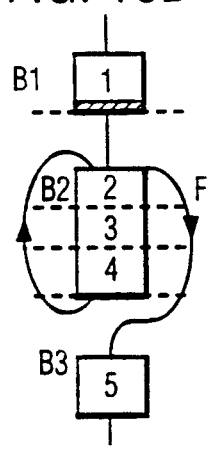
Figure 11A:
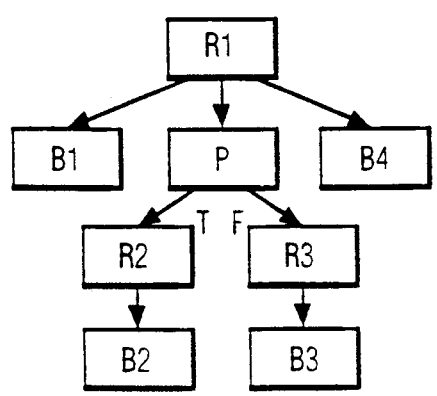
FIGS. 11A and 11B illustrate a control dependence graph.
Figure 11B:
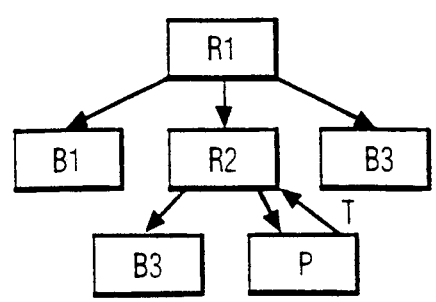

The control dependence graph for each of the program structures of FIGS. 10A and 10B are shown in 11A and 11B. The control dependence graphs illustrate program structure which lie in the same control region. Instructions may be moved back and forth between blocks of a given region if appropriate branch instructions are introduced. For instance, if instructions from $B_4$ are included with a line of instructions from block $B_1$, a conditional statement is included to be certain that all $B_1$ instructions are executed prior to executing any instructions to $B_4$. The method for repositioning code using the control dependence graph is similar to that used in the control flow graph in that the innermost statements corresponding to regions in the lowest level of the control data graph are processed first. If the code for a region does not fit an integral number of lines, and attempt to achieve such code fitting in an integral number of lines, is effected through code motion.

Other repositioning techniques may include repositioning instructions of two paths of a branch instruction such that all branch targets are prefetched into the same line. Therefore, each time a cache line is fetched, it contains instructions for both paths.

In repositioned instruction code there may be included memory space of a fragmented memory cache directives. The cache directives are specific instructions which are only visible to the cache controller, and otherwise direct fetching to instructions which are anticipated.

Thus, there is described a technique for advantageously repositioning and compiling instruction codes within a central memory. Repositioned instruction codes result in less instruction cache pollution and fewer cache misses, without altering the instruction cache prefetch routine. Those skilled in the art will recognize yet other embodiments described more particularly by the claims which follow.

What is claimed is:

1. In a computer processing system for executing stored program instructions, a method of compiling said program instructions for improving instruction cache performance comprising the computer implemented steps of:
   generating an initial sequence of execution of said program instructions;
   arranging said program instructions in a program memory according to groups, at least one of the groups beginning with a jump entry point, said arranging step comprising:
   positioning the groups within the sequence so that a distance between a start of each nonterminal group and a start of a next group is an integral multiple of a distance between a first line and a last line in a cache memory; and
   when the group does not have a length corresponding to an integer number of cache lines, storing position adjusting information at the end of the group.

2. The method of claim 1 wherein said generating and arranging steps are performed by a compiler and wherein conditional branch statements reference target instructions for further program instruction and wherein the arranging step further comprises grouping the target instructions in a single line so that when the combined instructions are read into the instruction cache, the combined instructions begin at a cache line boundary.

3. The method of claim 2, wherein said line of instructions containing said target instructions immediately follows a corresponding stored branch instruction in said memory.

4. The method of claim 3 further comprising the step of inserting in said memory, instructions which are transparent to said processor, but which are acted on by an instruction cache processor.

5. In a computer processing system for executing stored program instructions, a method of compiling said program instructions for improving instruction cache performance comprising the computer implemented steps of:
   generating an initial sequence of execution of said program instructions;
   arranging said program instructions in a program memory according to groups, each group containing a plurality of instructions which will execute sequentially, said storing step comprising:
   positioning a group in the program memory so that when the group is read into the instruction cache the group begins at a cache line boundary; and
   when the group does not have a length corresponding to an integer multiple of cache lines, storing position adjusting information at the end of the group.

6. The method of claim 1 wherein the position adjusting information is blank space.

7. The method of claim 1 wherein the position adjusting information comprises instruction information from a succeeding group.

8. The method of claim 1 wherein the group comprises a sequence of instructions executed by an occurrence of a condition within a conditional branch instruction.

9. The method of claim 1 wherein the group comprises instructions within a same loop.

10. The method of claim 1 wherein said generating step is performed by a compiler which compiles said program instructions.

11. The method of claim 1 wherein
a first one of said groups comprises instructions reachable when evaluation of a condition of a conditional branch instruction gives a first result;
a second one of said groups comprises instructions to be executed when evaluation of the condition gives a second result; and
the positioning step comprises
positioning the first group in the program memory so that, when the first group is read into the instruction cache, the first group begins at a first cache line boundary; and
positioning the second group in the program memory so that, when the second group is read into the instruction cache, the second group begins at a second cache line boundary, which second cache line boundary is after an end of the first group.

12. The method of claim 11, further comprising the step of prefetching the first and second group into the instruction cache together, after prefetching of the conditional branch instruction.

13. The method of claim 11, further comprising the step of choosing said first group to represent a more likely evaluation of the condition.

14. The method of claim 11, further comprising the step of positioning instructions, which automatically follow after execution of either the first or the second group, between an end of the first group and a beginning of the second group.

15. The method of claim 1 wherein
said determining and storing steps are performed by a compiler;
said determining step further comprises
identifying blocks of instructions within said computer program which blocks each constitute a respective one of: a loop, a group reachable as a result of evaluating a conditional branch, or a basic block of sequential instructions; and
forming a representation equivalent to a flow graph of said computer program, which flow graph comprises a series of nodes representing each of said identified blocks, and a series of subnodes identifying blocks contained within said blocks; and
said positioning step further comprises positioning instructions corresponding to nodes in the program memory so that when such instructions are loaded into the instruction cache each node begins at a cache line boundary.

16. The method of claim 1 wherein
said generating and arranging steps are performed by a compiler;
said determining step further comprises forming a representation equivalent to a control dependence graph which divides said program into regions, each region containing instructions which require identical conditions to be true for execution; and
said positioning step further comprises positioning instructions corresponding to regions in the program memory so that when such instructions are loaded into the instruction cache each region beings at a cache line boundary.

17. The method of claim 16 further comprising:
examining each line in said instruction cache for the presence of a data dependency which identifies program execution sequence for said instructions; and,
prefetching said instructions according to said execution sequence.

18. In a computer processing system for executing stored program instructions, a method of compiling the instructions to increase cache efficiency comprising: the computer implemented steps of
organizing the instructions into lines of instructions for storing in a memory; and
grouping each target instruction of a conditional branch statement in a single line, whereby during execution of the branch statement, one line including all target instructions is prefetched in the cache.

19. The method of claim 18, further comprising the step of inserting in said memory, instructions which are transparent to said processor but which are acted on by an instruction cache processor.

* * * * *